UNITED STATES PATENT OFFICE.

J. D. WHELPLEY AND J. J. STORER, OF BOSTON, MASSACHUSETTS.

IMPROVED METHOD OF TREATING THE MIXED SULPHURETS OF ZINC AND LEAD.

Specification forming part of Letters Patent No. 59,694, dated November 13, 1866.

*To all whom it may concern:*

Be it known that we, JAMES D. WHELPLEY and JACOB J. STORER, of Boston, in the county of Suffolk and State of Massachusetts, have invented a new and useful Method of Treating the Mixed Sulphurets of Zinc and Lead; and we do hereby declare that the following is a full, clear, and exact description of the construction and operation of the same.

Galena and blende are frequently, if not invariably, associated minerals. In treating this mixed sulphuret it has heretofore been customary to waste one or the other of the metals present.

We use the following method, which saves both in salable form:

First. Pulverization and burning in water-furnace. We pulverize the mineral thoroughly, and burn it in our water-furnace, as already described in a previous application now in the Patent Office. The results of this burning are soluble sulphate of zinc and insoluble sulphate and binoxide of lead.

Second. We draw off the solution of sulphate of zinc, and reduce the lead from the oxide and sulphate of the pulp by roasting with charcoal in the usual way. The silver, if any present, will be in the lead, and may be extracted by cupelling, or by any of the numerous processes for the separation of silver from lead.

Third. Chlorination of the zinc. We add to the solution of sulphate of zinc an equivalent quantity of chloride of lime, and obtain chloride of zinc in solution and sulphate of lime as a precipitate.

Fourth. Oxidation of the zinc. We remove the solution of chloride of zinc to another vessel, and add to it an equivalent quantity of milk of lime, obtaining hydrated oxide of zinc precipitated and chloride of lime in solution, to be again used in manipulation third.

The oxide of zinc thus precipitated when deprived of its water by heat is the well-known zinc-white, and may be metallized by roasting with charcoal in the English or Belgian zinc-furnace.

We claim neither of these four manipulations separately; but

We claim—

1. The first, third, and fourth manipulations in their order as a means or method of treating zinc blende.

2. The first, third, and fourth manipulations in their order, with the addition of the second, as a method or means of treating associated blende and galena.

JAMES D. WHELPLEY.
JACOB J. STORER.

Witnesses:
W. J. LADD,
THOS. WM. CLARKE.